United States Patent [19]

Bauer et al.

[11] 3,993,201

[45] Nov. 23, 1976

[54] APPARATUS FOR TRANSPORTING AND STORING HEAVY COMMODITIES

[75] Inventors: Heinrich Bauer; Karl-Heinz Dörner, both of Grevenbroich; Helmut Eberlin, Wyhlen; Hans Kaulen, Grevenbroich; Werner Pazurek, Grenzach-Horn; Heinz Richarz, Grevenbroich; Harro J. Taubmann, Rheinfelden; Gerhard Wolf, Grevenbroich-Neuenhausen, all of Germany

[73] Assignees: Eisenbau Wyhlen AG, Wyhlen; Vaw Leichtmetall GmbH, Bonn, both of Germany

[22] Filed: Sept. 20, 1973

[21] Appl. No.: 399,182

[52] U.S. Cl. .................. 214/16.4 A; 29/200 A; 214/16.4 B; 214/1 R
[51] Int. Cl.² ......................................... B23P 17/00
[58] Field of Search ............. 214/16 B, 1 R, 16.4 B, 214/DIG. 3, DIG. 4, 152, 38 C, 38 CA, 38 CC, 38 CB, 130 C, 89, 16.4 A; 29/33 P, 33 Q, 430, 200 A; 72/250–252; 198/19; 148/153, 155

[56] References Cited
UNITED STATES PATENTS

| 1,261,504 | 4/1918 | Fitch ................................. 214/16 B |
| 1,305,802 | 6/1919 | Hulett ........................... 214/16 B X |
| 2,848,124 | 8/1958 | Angell et al. ................. 214/130 C X |
| 3,093,252 | 6/1963 | Cahill ........................... 214/16 B X |
| 3,370,727 | 2/1968 | Shaw ................................. 214/512 |
| 3,559,822 | 2/1971 | Lichtenford et al. ...... 214/16.4 A X |
| 3,673,658 | 7/1972 | Hagen ............................. 29/430 X |
| 3,747,189 | 7/1973 | Kawasaki ...................... 214/16 B X |
| 3,820,216 | 6/1974 | VanDer Lely et al. .......... 29/200 A |

FOREIGN PATENTS OR APPLICATIONS

956,580    4/1964    United Kingdom ............ 214/130 C

Primary Examiner—Frank E. Werner
Attorney, Agent, or Firm—Michael J. Striker

[57] ABSTRACT

A production line wherein extremely heavy and bulky commodities, such as metallic bands which are convoluted on reels and weigh up to and in excess of 20,000 lbs., are treated at several stations is provided with a first magazine at the receiving end, a second magazine at the discharge end and an intermediate magazine between two neighboring departments. The commodities are transported in the magazines by vehicles which are movable lengthwise as well as up and down to store the commodities at different levels or to withdraw commodities from selected compartments of the respective magazines. Additional vehicles in the form of cars, lifters, cranes or the like are provided to transport commodities from a preceding magazine, to stations which are adjacent to various machines of the production line, and from such machines to the next magazine, always at a level above or below the level of the production line. The production line may be set up to anneal the commodities which are withdrawn from the first magazine prior to introduction into the first magazine, to thereupon roll the commodities in one or more passes, to trim the commodities, to subdivide the commodities, and to heat the commodities prior to storage in the second magazine from which the commodities are withdrawn for transport to inspecting, packing and/or other stations.

4 Claims, 8 Drawing Figures

APPARATUS FOR TRANSPORTING AND STORING HEAVY COMMODITIES

BACKGROUND OF THE INVENTION

The present invention relates to a method and apparatus for automatic handling, transporting and storing bulky and heavy commodities, such a reels of elongated metallic stock, convoluted webs of paper, metallic or plastic foil, textile material or the like, some of which are described in "PLASTICS FILM TECHNOLOGY" by W. R. R. Park (1969), Van Nostrand Reinhold Company, New York. More particularly, the invention relates to a method and apparatus for transporting, temporarily storing, orienting and/or otherwise manipulating bulky and extremely heavy commodities which are being treated in one or more production lines. For example, the method and apparatus can be resorted to in connection with the manipulation of commodities having a weight in excess of 5,000 kilograms.

Extremely heavy commodities, e.g., in the form of reels for wound metallic rod, sheet or strip stock, are manipulated in a variety of plants, such as in rolling mills. As a rule, the stock must be unwound from a reel, transported through successive stations of one or more complete production lines, and again collected on the core of a reel for transport to storage or for shipment to customers. Similar problems arise in certain printing plants wherein extremely long webs of paper or textile material are imprinted, impregnated and/or otherwise treated; in manufacturing and processing plants for metallic or plastic foils; in finishing rolling mills for sheet metal; and many other establishments. It is often necessary to repeatedly unwind and collect extremely long webs, strips or rods of metallic or other material which is stored on reels or spools, an operation which can be carried out only by resorting to extremely complex, large, heavy and expensive equipment. Since the paying out and collecting of webs, strips or rods is a time-consuming operation, the manufacturers strive to use extremely long stock to thus reduce the intervals of idleness of machines which form the production line. It is not unusual to collect metallic sheet or rod stock in the form of rolls weighing well in excess of 10,000 kilograms. Similar problems arise when a production line is set up for the treatment of bulky blocks of metallic material which must be turned, lifted, lowered, inverted, tilted and/or otherwise manipulated at each of a series of treating stations. It is already known to treat such heavy and bulky commodities in accordance with a predetermined schedule.

In certain plants, such as in factories employing recent types of rolling mills, heavy and bulky commodities are transported by overhead cranes and by floor-type lift trucks which are not confined to travel along tracks. The storing of commodities in the interior of the plant takes place at certain predetermined locations, or the commodities are stored in sheds which are located outside of the plant proper. The storing in the interior of the plant and/or the transport within the plant presents many problems due to excessive stressing of the floor; therefore, such storing and/or transport is permissible only if the building is properly designed so that it can stand extremely high stresses. Moreover, the storing of a large number of bulky commodities in the interior of a factory contributes excessively to the dimensions of the building or results in clogging of the area in the vicinity of machines so that the components of the production lines are not readily accessible for inspection and/or repair. This problem is particularly acute when the commodities must be treated in a large number of machines each of which occupies a substantial amount of floor space and/or extends to a level well above the floor. Attempts to solve the just discussed problems include the utilization of complex conveyances which can transport bulky commodities in any one of several directions or simultaneously in several directions. This reduces somewhat the likelihood of congestion but delays considerably the transfer of commodities from station to station.

In certain other plants, bulky and extremely heavy commodities are transported by simple roller conveyors which are designed to advance the commodities along straight paths. Such conveyors take up space and are satisfactory only when the orientation of commodities need not be changed at all or when the commodities must be reoriented at a single station or at a small number of stations. In all other instances, the plant must be provided with complex turning, lifting, tilting, inverting, shifting and/or other reorienting equipment which is extremely costly and occupies a substantial amount of floor space. Moreover, certain commodities are so sensitive that they cannot or should not be repeatedly gripped by the jaws or analogous parts of tilting, lifting and/or other reorienting or displacing instrumentalities.

The just discussed problems in connection with the manipulation of commodities whose weight is in excess of one, five or ten thousand kilograms are aggravated due to the fact that the equipment which is presently used for such manipulation must be sufficiently safe and must be capable of handling bulky commodities without any danger of damage to parts of the equipment and/or to the processed material. This, too, contributes to the initial and maintenance cost of such equipment, to its bulkiness and complexity, to its sensitivity, as well as to the cost of the final product. There exists an urgent need for a method and apparatus which can be resorted to for economical handling of extremely heavy and bulky workpieces, which can be installed in existing plants, which renders it possible to avoid damage to the buildings, to the apparatus, to the production line and/or to the workpieces, and which also permits automatic remote control of transport and handling to allow fully automatic production processes.

SUMMARY OF THE INVENTION

An object of the invention is to provide a simple, reliable and economical method of manipulating heavy and bulky metallic and/or other commodities which must be treated in each of a series of machines which form part of one or more production lines. The method must permit fully automatic remote control, including safety interlocks and suitable for computerization.

Another object of the invention is to provide a method of transporting and storing heavy commodities in an optimum position for introduction into selected processing machines and in such a way that the commodities are accessible to pieces or relatively simple transporting, orienting, lifting and/or other equipment.

A further object of the invention is to provide a novel and improved apparatus system for transporting, storing, orienting, lifting and/or otherwise manipulating heavy commodities or workpieces weighing in the range of up to and in excess of 10,000 kilograms.

The method of the present invention may be resorted to for manipulation of extremely heavy and bulky commodities, especially coiled metallic band stock or the like weighing up to and in excess of 20,000 lbs., in a plant wherein the stock is treated at several stations of at least one production line which is located at a predetermined level. The method comprises the steps of transporting the commodities between the stations at at least one second level which is located above or below the predetermined level, and storing the commodities in separate buildings at the receiving and discharge ends of the production line as well as, if necessary, at one or more intermediate points of the production line.

The method makes use of handling and transporting apparatus with simplified movements and giving rigid support to the reel without gripping the wound goods. The apparatus movements are combined in straight line or star transfer arrangements. The rigid supporting allows for high acceleration without load shift. The simplified movements, for example, only up-or-down and forward-or-backward, permit more reliable construction and multiple use of standardized apparatus in the same plant. Arrangement of transport paths in straight or radial lines, together with reliable construction design, substantially facilitates automation of the handling, fully interlocked with the production lines.

The commodities are preferably stored in high stack warehouses wherein the commodities may be put to temporary storage at a plurality of different levels. The devices for transporting the commodities between the magazines and the various stations may include one or more cranes, jacks, cars, dollies, turning devices, vehicles which are movable up and down as well as along horizontal paths, and/or others. At least one of the magazines may be provided with means for cooling the commodities therein to or somewhat above room temperature.

The production line may be designed to subject bandlike metallic stock to rolling treatment in a plurality of passes, to anneal the stock, to subdivide the stock into shorter sections, to trim the stock, to wind the shorter sections onto smaller and handier reels, and/or to perform any other operations which must be completed before the finished material is transferred to an inspecting or packing station or is introduced into a magazine for storage prior to transport to customers.

The novel features which are considered as characteristic of the invention are set forth in particular in the appended claims. The improved apparatus system itself, however, both as to its construction and its mode of operation, together with additional features and advantages thereof, will be best understood upon perusal of the following detailed description of certain specific embodiments with reference to the accompanying drawing.

The attached drawing shows diagrammatically by way of example and application of the method and apparatus for the almost fully automated plant for the cold reduction of sheet metal to thin gage wound in coils.

BRIEF DESCRIPTION OF THE DRAWING

FIGS. 01 and 02 show a layout of the full plant in horizontal and vertical section;

DESCRIPTION OF THE PREFERRED EMBODIMENTS

Figure 01:
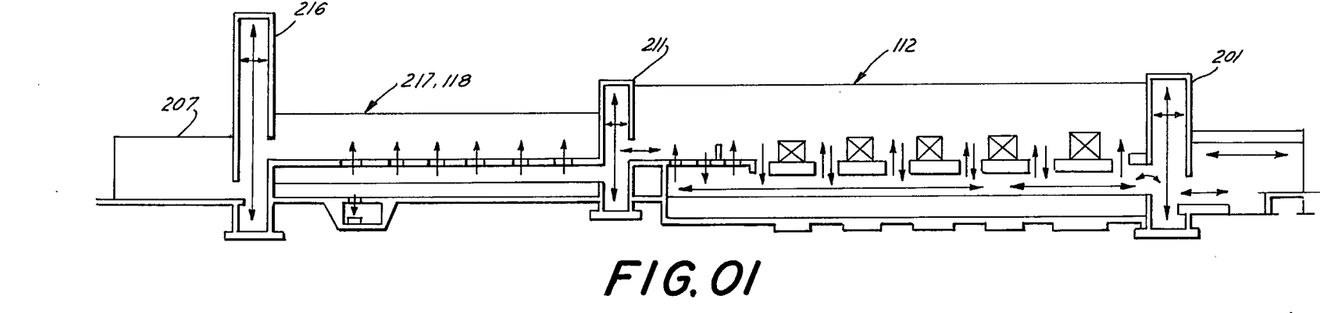
Figure 02:
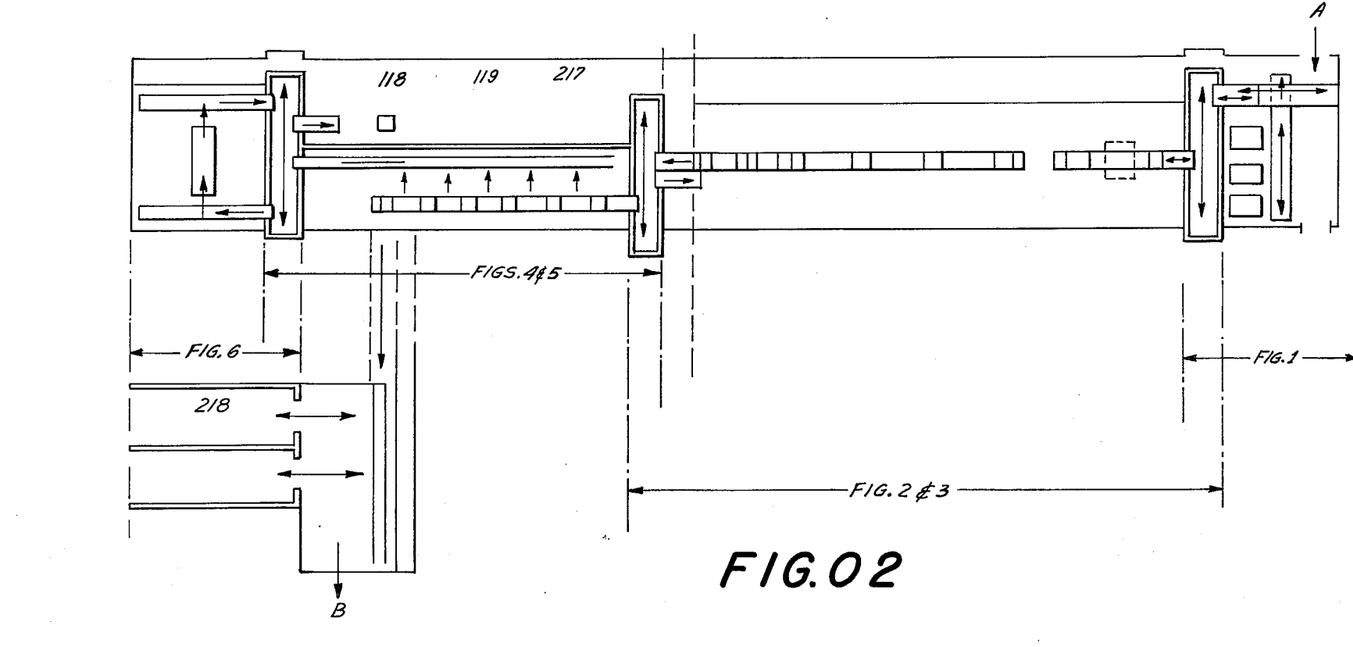

FIGS. 01 and 02 give an overall illustration of the complete plant to which the method and apparatus system have been applied.

Sheet metal in coils with rolling temper arrive at A, are annealed to a soft temper and go to cooling into the high stack warehouse 201.

Coils at room temperature are transported from warehouse 201 to the first and second mill stands in the rolling mill section 112. The sheet metal heats up due to the work during each reduction pass and is returned to the warehouse 201 for cooling to room temperature.

The gage becomes thinner and the sheet becomes much longer; therefore, the sheet is divided by a shear on the second mill and wound on two separate reels which are thereupon transferred to mill stands 3–5 and intermediate storage in the high stack warehouse 211.

From warehouse 211 the coils enter the slitting and rewinding section 217. They are rewound to customers' specifications and are then annealed to a soft temper in section 207. Afterwards, they are allowed to cool in the high stack warehouse 216 before they go to section 118 for inspection testing and packaging.

The packaged goods are then transferred by a roller conveyor to the high stack warehouse 218 from where they are combined to form car size transport loads and leave at B.

Except for the unloading at A, loading at B, slitting at 217 and packaging at 118, all other operations are fully automated and interlocked with the processing machinery.

Figure 1:
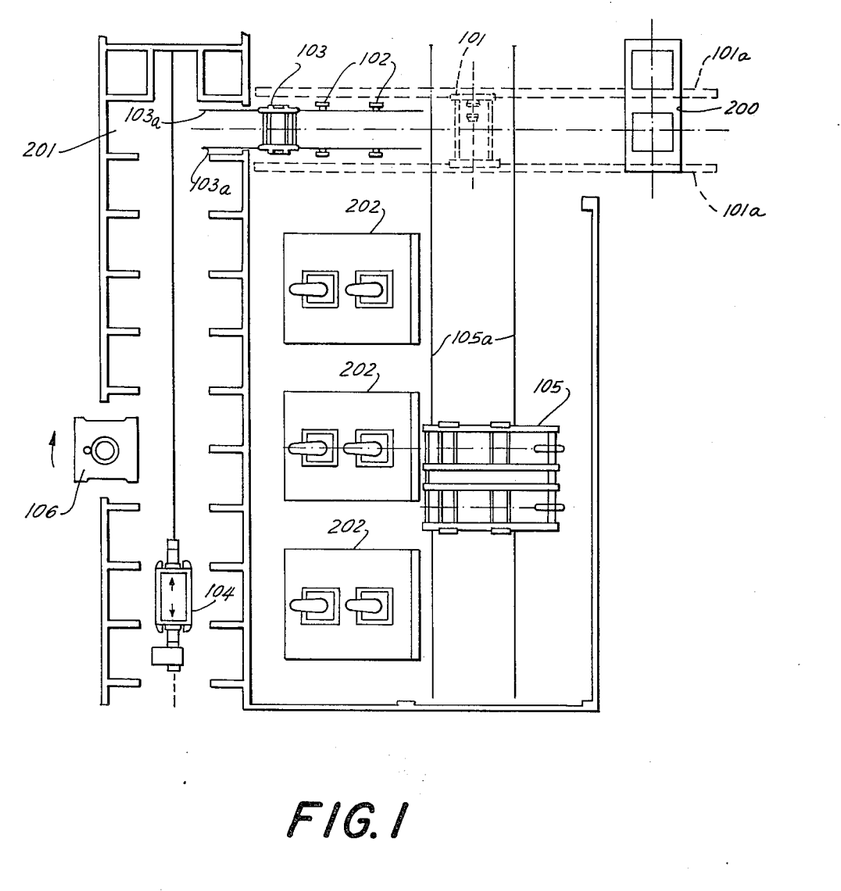
FIG. 1 is a diagrammatic plan view of the first plant section on a larger scale and shows the material entry for receiving rolled coils of thicker gage, a battery of annealing furnaces and the first high stack warehouse.
Figure 2:
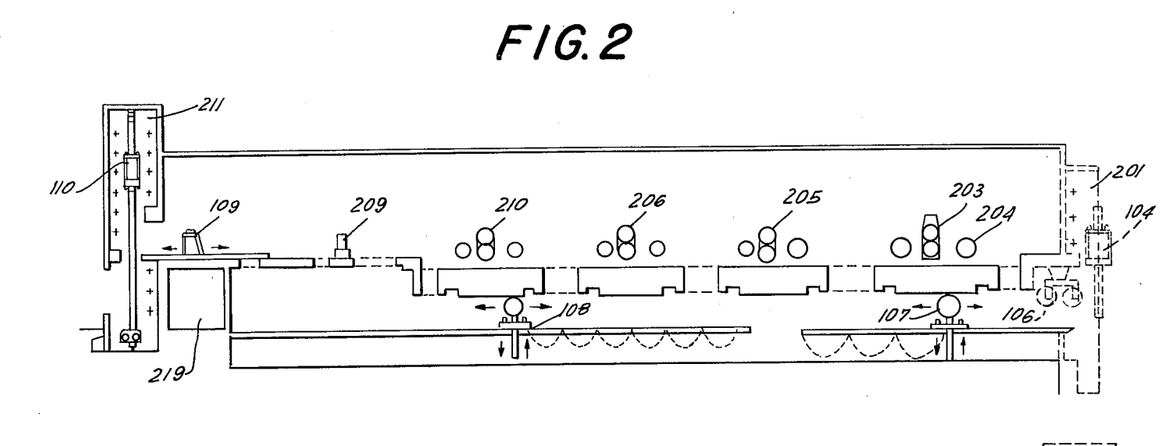
FIG. 2 overlaps with FIG. 1 and is a diagrammatic elevational view of a second plant section wherein the bands are treated in a plurality of rolling mills and are trimmed prior to introduction into second or intermediate high stack warehouse.

To show the method in more detail, FIGS. 1 to 6 have been drawn to enlarged scale, overlapping as shown in FIGS. 01 and 02.

FIG. 1 illustrates the floor plan of a first section or department of a sheet metal cold rolling plant with a battery of three annealing furnaces 202. The inlet or receiving station of the production line in the plant is shown at 200 where trucks, railroad cars or other heavy-duty vehicles can deliver heavy and bulky commodities, i.e., reels or spools with coiled metallic sheet or band stock. The commodities which are delivered to the receiving station 200 can be removed by a transporting device or crane 101 which is movable along fixed overhead rails 101a to transfer commodities from the station 200 to any one of several intermediate or temporary storing locations or stations 102. The crane 101 has three movements: rising or lowering, turning and to or fro. A transporting device or coil lift car 103 with only up or down and to and fro movement is mounted for travel along rails 103a and serves to transfer commodities from the storing locations 102 into a first high stack warehouse or storing means 201. The commodities which enter the high stack warehouse 201 can be conveyed by a floor-mounted monorail stacking machine 104 which is shown as being movable at right angles to the rails 103a and 101a. The warehouse 201 further receives a turntable transfer device 106 for the coils. This warehouse can be provided with shelves or racks (not specifically shown) which enable it to store a large number of coils (e.g., 150 or more).

FIG. 1 further shows a pair of furnace charging transporting devices or cars 105 which are movable along rails 105a toward and away from the path of the crane 101 to introduce commodities into the annealing furnaces 202. These furnaces are adjacent to the magazine 201.

Figure 3:
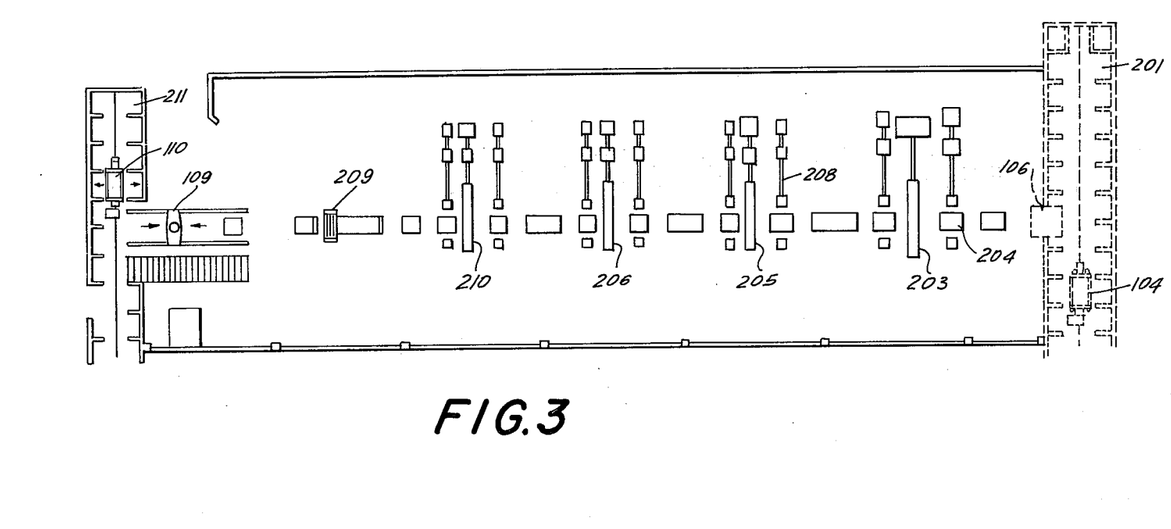
FIG. 3 is a diagrammatic plan view of the structure shown in FIG. 2.

The second section of the plant is shown in FIGS. 2 and 3. This section accommodates a group of four rolling mills 203, 205, 206, 210 and a depository or station 204 for coils at the entry and exit of each rolling mill. Two coil lift and transfer cars 107 and 108 which can move the coils and empty reels up or down as well as sideways are installed at a level below th rolling mills and the first car 107 is mounted for travel lengthwise of the group 203, 205. The rolling mills 205 and 206 are followed by the finishing mill 210 which is serviced by the device 108. The reference character 209 denotes a trimming or edging machine for the material issuing from the finishing mill 210. The rolling mill 205 is associated with a cutter or shears 208.

A further transporting device in the form of a straddle or straddle lift car 109 is provided to deliver commodities into an intermediate high stack warehouse 211 wherein the commodities are moved up or down or lengthwise of the warehouse 211 by a stacking machine 110 and can be stored in suitable racks, not shown. The car 109 is installed above an underground passage 219.

Figure 4:
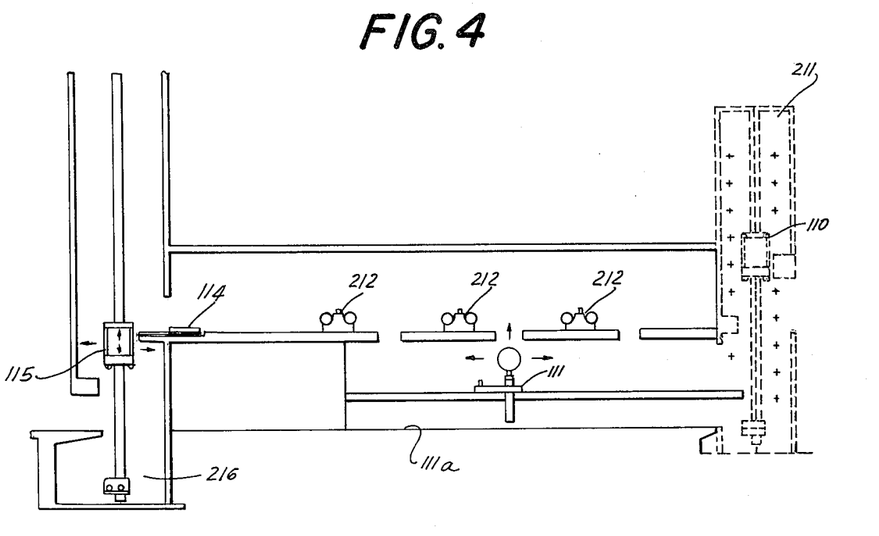
FIG. 4 overlaps with FIG. 2 and is a diagrammatic elevational view of a third plant section wherein the bands are treated in slitting and rewinding machines and are thereupon transferred into a third high stack warehouse at the discharge end of the production line.
Figure 5:
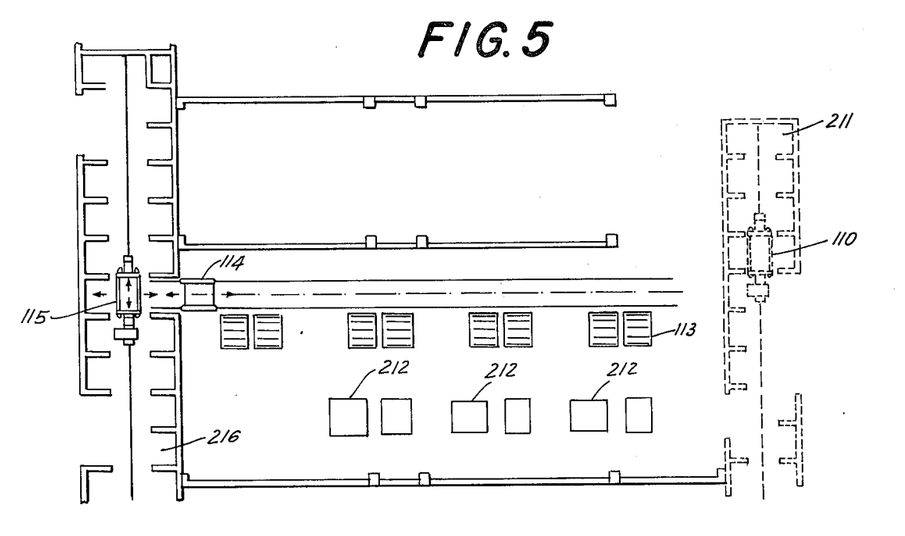
FIG. 5 is a diagrammatic plan view of the structure shown in FIG. 4.

A third section of the plant is shown in FIGS. 4 and 5. This section receives commodities from the intermediate warehouse 211 and contains a battery of slitting and rewinding machines 212 located at a level above one or more rail-mounted transporting devices or lift cars 111. The latter are movable lengthwise of the row of machines 212. A high stack warehouse 216 with racks for the storage of commodities contains a stacking machine 115 and is located at the discharge end of the third section. A transporting device or straddle lift car 114 is provided to transport commodities resting in iron frames from storing stations 113 to the machine 115. The stations 113 can receive annealed material and the straddle frame of the conveyance 114 is also designed to transport material whose temperature is high.

All slitters or rewinders 212 can receive commodities from a single lifting device 111 or the rails 111a below the machines 212 can support two or more lifting devices.

Figure 6:
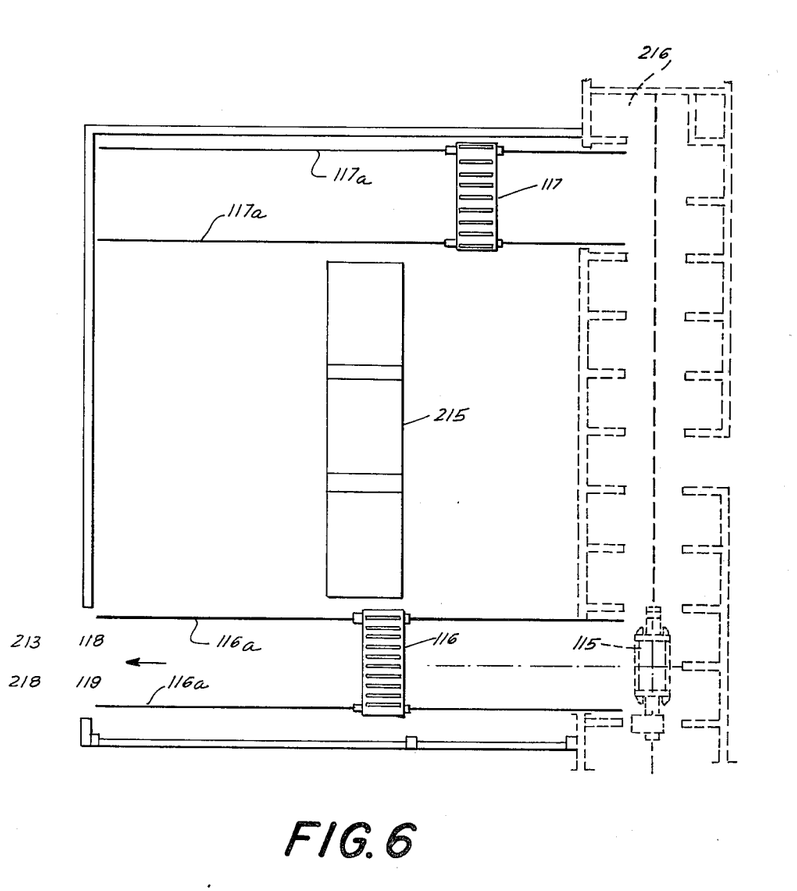
FIG. 6 overlaps with FIG. 4 and is a diagrammatic plan view of the third high stack warehouse at the discharge end of the production line and of a continuous annealing furnace wherein the bands are heated prior to cooling in the warehouse and prior to subsequent transfer to inspecting, packing and/or other stations.

The fourth section of the plant is shown in FIG. 6. This section connects the warehouse 216 wih two transporting devices in the form of furnace charging cars 116, 117 which are movable along two spaced-apart pairs of rails 116a, 117a. The cars 116, 117 are movable toward and away from the respective ends of the warehouse 216 and can deliver commodities to further (testing 118, inspecting 119, packing 213 and-/or other 218) stations. A continuous heating or pusher type furnace 215 is installed in the space between the rails 216a, 217a, and serves to anneal the slit and rewound coils mounted on iron frames.

At least the warehouse 216 may be equipped with a suitable cooling system to insure that the annealed coils are cooled to room temperature prior to transport to the next section.

It is assumed that the entering commodities are rolled sheets in the form of coils having a thickness of 0.8 millimeter and being wound in the form of coils weighing about 10,000 kilograms. The coils are delivered to the receiving station 200 of FIG. 1 by railroad cars. The crane 101 engages the axial ends of the reels and turns, if necessary, each reel through 180°. During such operation, the crane 101 is controlled by hand but its operation becomes automatic as soon as a reel is properly held. In accordance with a preselected program, the crane 101 deposits the reel onto a charging car 105 or into one of the storing locations 102. The lift car 103 removes the commodities seriatim from the locations 102 and introduces them into the first high stack warehouse 201 where the commodities are taken over by the stacking machine 104 and placed into or onto empty racks. The transport of commodities onto the racks of the warehouse 201 takes place automatically, for example, by resorting to a remote control system using punched cards. The control system records the placing of each commodity onto the corresponding rack of the warehouse 201, as well as each subsequent processing step.

If desired, the charging car or cars 105 can receive commodities directly from the receiving station 200. Alternatively, the car or cars 105 can receive commodities from the warehouse 201. The commodities are introduced into an empty annealing furnace 202 and such operation, too, can be regulated automatically by a remote control system using punched cards or the like.

The annealing in furnaces 202 prepares the commodities for treatment in the rolling mills 203, 205, 206, 210 of FIGS. 2 and 3. The material of the commodities which are supplied to the station 200 is provided with a hard rolled temper. The annealed commodities which leave the furnaces 202 are introduced into the warehouse 201 and are cooled therein to or somewhat above room temperature.

The equipment which manipulates the commodities in the department of FIG. 1 performs only lifting, lowering and angular movements and is caused to travel only along straight paths. This renders it possible to regulate the movements of such equipment (which includes the crane 101, car or cars 105, car 103, turning device 106 and stacker 104) with a high degree of accuracy and by resorting to an automatic control system. As mentioned before, only certain movements of the crane 101 must be controlled by an attendant due to the fact that the cars or trucks which deliver commodities are unlikely to deposit the commodities at the station 200 in such accurately determined positions that the crane 101 could be manipulated exclusively in accordance with a predetermined schedule.

The storing locations 102 of FIG. 1 are assumed to comprise simple stands or supports for reels carrying coiled metallic bands. It is further assumed that the lift car 103 is provided with suitable means for gripping the free ends which extend from the reels resting on the supports at the locations 102. The car 103 is movable back and forth along a straight horizontal path (see the rails 103a) and comprises means for moving the commodities thereon up and down. All movements of the car 103 and of its lifting means are initiated and monitored in a fully automatic way.

The movements and position of the stacking machine 104 in the warehouse 201 of FIG. 1 are also monitored and indicated by an automatic encoding system. For example, the material handling and the vehicle 104 may be constructed, assembled and positioned in a manner as disclosed in Swiss Pat. Nos. 520,612; 523,848 (corresponding to U.S. Pat. application Ser. No. 269,464 filed July 6, 1972, by Herman Grevenstein for "Device for Raising and Lowering Loads" now U.S. Pat. No. 3,796,285); Ser. Nos. 534,100 and 536,790 (corresponding to U.S. Pat. application Ser. No. 273,143 filed July 19, 1972, by Walter Suter for "Process and Device for the Fine Positioning of a Vertically Movable Platform in Front of a Pallet Location", now U.S. Pat. No. 3,822,766) and Ser. No. 535,688 (corresponding to U.S. Pat. application Ser. No. 283,371 filed Aug. 24, 1972, by Rolf Hochstrasser for "Process and Apparatus for Positioning a Vehicle" now U.S. Pat. No. 3,845,715). This vehicle may resemble or is identical with the vehicle 110 in the intermediate warehouse 211 of FIGS. 2 and 3, and/or with the vehicle 115 in the warehouse 215 of FIGS. 4 and 5. The only difference is that the transmission ratios of gearings in the vehicle 104, 110 and 115 are different due to decreasing weight of commodities as their treatment progresses.

The coil lift cars 103, 107, 108 and 111 are also of well known and identical sample construction and differ only in the length of strokes of their hoist spindles or rams. Again, the two straddle lift cars 109 and 114 are of a type well known in the art and use identical parts thereby greatly facilitating maintenance and limiting the amount in stock of spare parts required.

The furnace charging car 105, a stock item of the trade, is mounted for sidewise movement and is provided with supports for the free ends of the reels. It is further provided with an articulately mounted pusher assembly which is capable of introducing reels into or of withdrawing annealed commodities from the furnaces 202. The movements of the car 105 are regulated by remote control and its positions are determined in accordance with a preselected program, similar to that described in the foregoing citations.

The warehouse 201 is of the high stack type (see the right-hand portion of FIG. 3) and is assumed to be capable of storing 150 commodities each of which weights about 10,000 kilograms. The first rolling mill 203 of FIGS. 2 and 3 is assumed to process 10–15 annealed commodities per day with up to 4–5 cold reducing passes and with the rewound coils being allowed to cool again to room temperature after each pass. For this, the heavy coils are returned to the warehouse after each pass and an alternative coil is brought to the mill. In the meantime, the empty reel is transferred from the unwinder side to the upwinder side of the mill.

The handling is fully automatic, rapid and smooth, the turnover is high and the warehouse 201 does not occupy excessive floor space. The work floor around the mills is free from obstructions and loads by the heavy coils. All of these operations are carried out in accordance with a predetermined program and the code system which is used to position the commodities is preferably similar to or identical with the code system for commodities which are delivered to the receiving station 200, and as already described in the foregoing citations.

The rolling mills 203, 205, 206 of FIGS. 2 and 3 are assumed to be of the latest type well known in the art and having a high output and being capable of reducing the thickness of the very soft bands to such an extent that the length of each band is increased. The shear 204 which is associated with the rolling mill 205 severs the band midway between its ends and the two halves or sections of each band are rewound to form two discrete coils. This necessitates the provision of additional reels or spools which can be withdrawn from a separate magazine or hopper. Such hopper can be refilled at required intervals by an overhead conveyor sytem, not shown. Each rewound coil weights about 5,000 kilograms because it carries only half of a band which has been wound on a reel delivered to the receiving station 200. Such reels are easier to manipulate subsequently than a reel weighing up to and in excess of 10,000 kilograms. If necessary, the rolled bands are trimmed in the machine 209 of FIGS. 2 and 3.

The turntable transfer device 106 is of well known type and is located at the inlet to the lower level which is formed by the foundations for the rolling mills 203, 205, 206, 210. The foundations include columns defining a space for the lifting device 107 which is movable back and forth along a straight horizontal path and comprises means for raising or lowering heavy commodities. The construction of devices 108 and 111 is similar to that of the lifting device 107.

A commmodity which is delivered by the stacking machine 104 in the magazine 201 is taken over by the device 106 which turns the commodity through 180° and places it in an optimum position to be taken over by the lifting device 107. The latter transports the commodity to the rolling mill which has been selected by the program and deposits the commodity onto the appropriate portion of the frame forming part of the selected rolling mill. In the meantime, the freshly rewound band at the other end of the selected rolling mill is ready for removal. Such band is picked up by the device 107 and is transferred to the turning device 106. The device 107 travels at a level below the rolling mill 203 and reaches the inlet end of the rolling mill 205. As mentioned before, the bands which reach the mill 205 are halved at 204 and each half is wound onto a discrete reel. The thus obtained pairs of reels are taken over by the device 108 which transports them lengthwise of the battery of rolling mills and lifts the reels so that they can be engaged by the straddle lift car 109 which delivers them to the intermediate high stack warehouse 211. The actual deposition of reels in the magazine 211 is carried out by the stacking machine 110. All of the just described operations are performed automatically. The selected program insures that a fresh commodity is delivered to the rolling mill which has practically completed the treatment of the preceding commodity, that the finished commodity is removed and put to storage and that the position of each commodity and the movements of all commodities are recorded at all times. The programming of the operation can be effected by resorting to punched cards, magnetic tape or the like.

The underground passage 219 below the straddle car 109 of FIGS. 2 and 3 constitutes an underground road for the traffic within the plant. This tunnel can be used by trucks for the loading and transport of superfluous empty reels.

The intermediate warehouse 211 performs the dual function of storing commodities which are to be fed into the department of FIGS. 4–5 and of temporarily storing the coils for rolling mills 203, 206 and 210. For example, the warehouse 211 can store up to and in excess of 800,000 kilograms of material in the form of coils each weighing about 5,000 kilograms.

The plant section of FIGS. 4–5 is adjacent to the warehouse 211. It serves to prepare the cold-rolled material for annealing. The machines 212 slit and rewind the bands at a floor level above the lifting device 111 which is movable in a corridor and serves to accept coils from the stacker 110 and the warehouse 211. Such coils are delivered to the cutting machines 212 which subdivide the bands into shorter sections each of which is rewound onto a smaller reel. The thus loaded reels are deposited on iron-frames which are transported by the straddle lift car 114 for storage in the high stack warehouse 216. The deposition of frames with coils thereon is effected by the stacker 115. The unused remainder of large coils is automatically returned into the warehouse 211.

The cutting and slitting of bands in the machine 212 of FIGS. 4–5 is carried out by full consideration of customers' specification. Therefore, the operations in the department of FIGS. 4–5 are normally semiautomatic up to the delivery of goods to the conveyance 114. From there on, the goods are again manipulated in accordance with a preselected program. The warehouse 216 is assumed to be capable of receiving about 300 frames.

The commodities which did not yet undergo a previous annealing treatment were withdrawn from the warehouse 216 for introduction into the department of FIG. 6. The stacker 115 transfers such commodities onto the charging car 116 for delivery to the intake end of the furnace 215. The frames with annealed commodities are discharged at the other end of the furnace 215 and are taken over by the vehicle 117 for delivery to the stacker 115 in the warehouse 216.

The selected mode of manipulating the commodities is preferably such that the bands on various reels need never be touched by any claws, jaws, grippers or analogous clamping or supporting parts. This reduces the likelihood of damage to, deformation and/or contamination of the stock. The annealed rolls are allowed to cool in the warehouse 216 and are thereupon removed by the vehicles 115, 116 for delivery to inspecting, packing and/or other stations. These latter operations are carried out semiautomatically under supervision of one or more attendants. The crates and cases with packed commodities ae palletized and then processed in a fully automatic way; they can be introduced into the warehouse 218 for storage or for shipment to customers.

It will be noted that the transporting devices for commodities are designed to perform relatively simple movements along straight or star paths. This simplifies the layout or the remote control system which is called upon to effect and regulate a relatively simple flow of material along straight and/or star-shaped paths. Such mode of operation and control renders it possible to reduce the overall dimensions of the plant. Moreover, the commodities can be transported by relatively simple, rugged and long-lasting transporting devices. As stated before, the commodities are transported in such a way that the bands are neither damaged, deformed or contaminated so that the number of rejects, cut-offs and trimmings is minimal. Furthermore, the conveyed commodities are held against swinging so that they can be rapidly accelerated and/or decelerated and transported at a high speed to thus contribute to a higher output of the production line.

It has been found that, even though the transporting devices which convey commodities between the warehouses 201, 211, 216 and the stations of the production line, as well as in the magazines, are designed to perform relatively simple movements (up or down or along horizontal paths), their overall number need not exceed the number of more complex transporting devices in conventional plants wherein the commodities are transported in such a way that each thereof has more than only a horizontal and a vertical component of movement. With the novel method, there is no need to tilt the commodities during, prior to or after transport. Additional savings are achieved by using several sets of similar transporting devices (such as 105, 110 and 115). The remote programming system is relatively simple and compact and insures that the operations can be carried out with highest reliability and a minimum of supervision. The simplicity of the programming system is attributable to the fact that the transporting devices perform simple translatory or vertical movements. Therefore, the components of the programming system can be accommodated in relatively small control panels.

The example for the preferred embodiment has been selected because the state of the art is well known, e.g., in "The Rolling of Metals" by L. R. Underwood, John Wiley & Sons Co. But also the solutions for the main handling problems have not shown any notable improvements over the last 30 years, though well documented for example by L. O. Millard in "Developments in Coil Conveyor Equipment Design", Iron and Steel Engineer Year Book (1950) Pittsburgh, page 175 and by D. A. McArthur in "Coil Handling in the Steel Industry," same Volume, page 241, as well as by W. B. Hackett in "Production of Aluminum Foil," Iron and Steel Engineer Year Book (1952), page 537.

Especially the problems described by the cited authors make understandable the progress which now has become possible with the new method, increasing throughput of an aluminum foil plant by more than 40 percent over conventional operation, at the same time drastically reducing the amount of scrap for rework.

Without further analysis, the foregong will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended:

1. Apparatus for manipulating heavy commodities, especially convoluted band stock or the like in a plant wherein said commodities are treated at several stations of at least one production line having a receiving end and a discharge end and being located at a first level, comprising first and second magazines respectively provided at the receiving and discharge ends of the production line; a floor located at said first level on which said several stations are located along a line spaced from each other, said floor being provided with openings between stations; a tunnel located below said floor at a second level different from said first level, said tunnel being vertically aligned with said line; a plurality of transporting devices to transport the commodities between said magazines and to and from said stations with said transporting devices and said commodities thereon as they are transported between said stations arranged in said tunnel at said second level different from said first level; and means on each of said transporting devices for transferring the commodities thereon from said second to said first level, whereby said transferring means may be used to lift said commodities from said transporting devices through said openings to said first level.

2. Apparatus as defined in claim 1, wherein at least one of said magazines is an upright magazine having means for the storage of commodities at a plurality of different levels.

3. Apparatus as defined in claim 2, wherein said transporting devices include a vehicle mounted in said first magazine for movement between said plurality of different levels and for movement along a substantially horizontal path between first and second end positions in said first magazine, and a conveyance arranged to supply commodities to said vehicle when the latter assumes one of said end positions.

4. Apparatus as defined in claim 1, wherein said transporting devices and said transferring means thereon comprise lift and transfer cars travelling through said tunnel and constructed to lift the commodities from said tunnel through said openings to said first level.

* * * * *